United States Patent
Kopish et al.

(10) Patent No.: US 9,617,732 B2
(45) Date of Patent: Apr. 11, 2017

(54) WALL PANEL SYSTEM

(71) Applicant: Krueger International, Inc., Green Bay, WI (US)

(72) Inventors: Andrew J. Kopish, Green Bay, WI (US); Robert M. Wittl, De Pere, WI (US); Mark D. Dart, Green Bay, WI (US); Timothy J. LaFleur, Appleton, WI (US); Nathan A. Quintal, De Pere, WI (US)

(73) Assignee: Krueger International, Inc., Green Bay, WI (US)

( * ) Notice: Subject to any disclaimer, the term of this patent is extended or adjusted under 35 U.S.C. 154(b) by 0 days.

(21) Appl. No.: 14/663,964

(22) Filed: Mar. 20, 2015

(65) Prior Publication Data

US 2016/0273214 A1    Sep. 22, 2016

(51) Int. Cl.
*E04B 2/74* (2006.01)
*H02G 3/38* (2006.01)
*E04B 2/82* (2006.01)
*E04B 2/76* (2006.01)
*E04B 2/78* (2006.01)
*E04C 3/04* (2006.01)

(52) U.S. Cl.
CPC .......... *E04B 2/7448* (2013.01); *E04B 2/7457* (2013.01); *E04B 2/827* (2013.01); *H02G 3/288* (2013.01); *E04B 2/767* (2013.01); *E04B 2/789* (2013.01); *E04B 2002/7462* (2013.01); *E04B 2002/7479* (2013.01); *E04B 2002/7494* (2013.01); *E04C 2003/0473* (2013.01)

(58) Field of Classification Search
CPC ........... E04B 2/7425; E04B 2002/7487; E04B 2002/749; E04B 2/82; E04B 2/824; E04B 2/827; E04B 2/7448; E04B 2/7455; E04B 2/7422; E04B 2/745; H02G 3/288
See application file for complete search history.

(56) References Cited

U.S. PATENT DOCUMENTS

| | | | |
|---|---|---|---|
| 3,782,048 A * | 1/1974 | Corman | ...................... 52/282.2 |
| 4,086,734 A | 5/1978 | Hayashi | |
| 4,103,463 A | 8/1978 | Dixon | |
| 4,449,337 A | 5/1984 | Gzym et al. | |

(Continued)

*Primary Examiner* — Adriana Figueroa
*Assistant Examiner* — Jessie Fonseca
(74) *Attorney, Agent, or Firm* — Andrus Intellectual Property Law, LLP

(57) ABSTRACT

A wall panel system including a plurality of wall panels that can be positioned adjacent to each other. Each of the individual wall panels includes an attachment slot that is positioned between upper and lower panel sections. The attachment slot allows external components to be mounted to the wall panel. Each individual wall panel includes a height adjustment mechanism having a support block positioned within an open interior of a bottom cross support rail. The support block receives an adjustment rod that is rotatable to adjust the height of the wall panel. The support block of the height adjustment mechanism includes support flanges that support the weight of the wall panel. The top cross support rail includes an attachment slot that receives a door track for supporting a sliding door. The attachment slot that receives the door track corresponds to the attachment slot positioned between upper and lower panel sections.

11 Claims, 6 Drawing Sheets

(56) References Cited

U.S. PATENT DOCUMENTS

| | | | |
|---|---|---|---|
| 4,555,880 A | 12/1985 | Gzym et al. | |
| 4,596,098 A * | 6/1986 | Finkbeiner | E04B 2/7427 |
| | | | 439/142 |
| 4,631,881 A * | 12/1986 | Charman | 52/220.7 |
| 4,905,428 A | 3/1990 | Sykes | |
| 5,042,555 A | 8/1991 | Owens | |
| 5,309,686 A | 5/1994 | Underwood et al. | |
| 5,414,967 A * | 5/1995 | Cates et al. | 52/281 |
| 5,524,402 A * | 6/1996 | Sykes | E04B 2/7424 |
| | | | 52/126.3 |
| 5,881,979 A | 3/1999 | Rozier, Jr. et al. | |
| 6,000,179 A | 12/1999 | Musculus et al. | |
| 6,141,925 A | 11/2000 | Halvorson, Jr. et al. | |
| 6,266,935 B1 | 7/2001 | Seiber et al. | |
| 6,557,310 B2 * | 5/2003 | Marshall et al. | 52/220.1 |
| 6,651,396 B2 | 11/2003 | DeRuiter et al. | |
| 6,688,056 B2 | 2/2004 | Von Hoyningen Huene et al. | |
| 6,802,171 B2 * | 10/2004 | McKinnon | 52/762 |
| 6,920,727 B2 | 7/2005 | Yu et al. | |
| 7,055,287 B2 | 6/2006 | Yu et al. | |
| 7,150,127 B2 | 12/2006 | Underwood et al. | |
| 7,543,412 B2 | 6/2009 | Long et al. | |
| 7,568,311 B2 | 8/2009 | Shivak et al. | |
| 7,814,711 B2 | 10/2010 | Milligan et al. | |
| 7,861,474 B2 | 1/2011 | Houle et al. | |
| 7,908,805 B2 | 3/2011 | Metcalf et al. | |
| 8,015,767 B2 | 9/2011 | Glick et al. | |
| 8,024,901 B2 | 9/2011 | Gosling et al. | |
| 8,151,527 B2 | 4/2012 | Gosling et al. | |
| 8,272,180 B2 | 9/2012 | Glick et al. | |
| 2003/0089057 A1 * | 5/2003 | Wiechecki et al. | 52/238.1 |
| 2003/0221384 A1 * | 12/2003 | Burken et al. | 52/238.1 |
| 2004/0020137 A1 * | 2/2004 | Battey et al. | 52/36.1 |
| 2006/0185250 A1 | 8/2006 | Gosling et al. | |
| 2007/0283640 A1 * | 12/2007 | Shivak | E04B 2/7455 |
| | | | 52/207 |

* cited by examiner

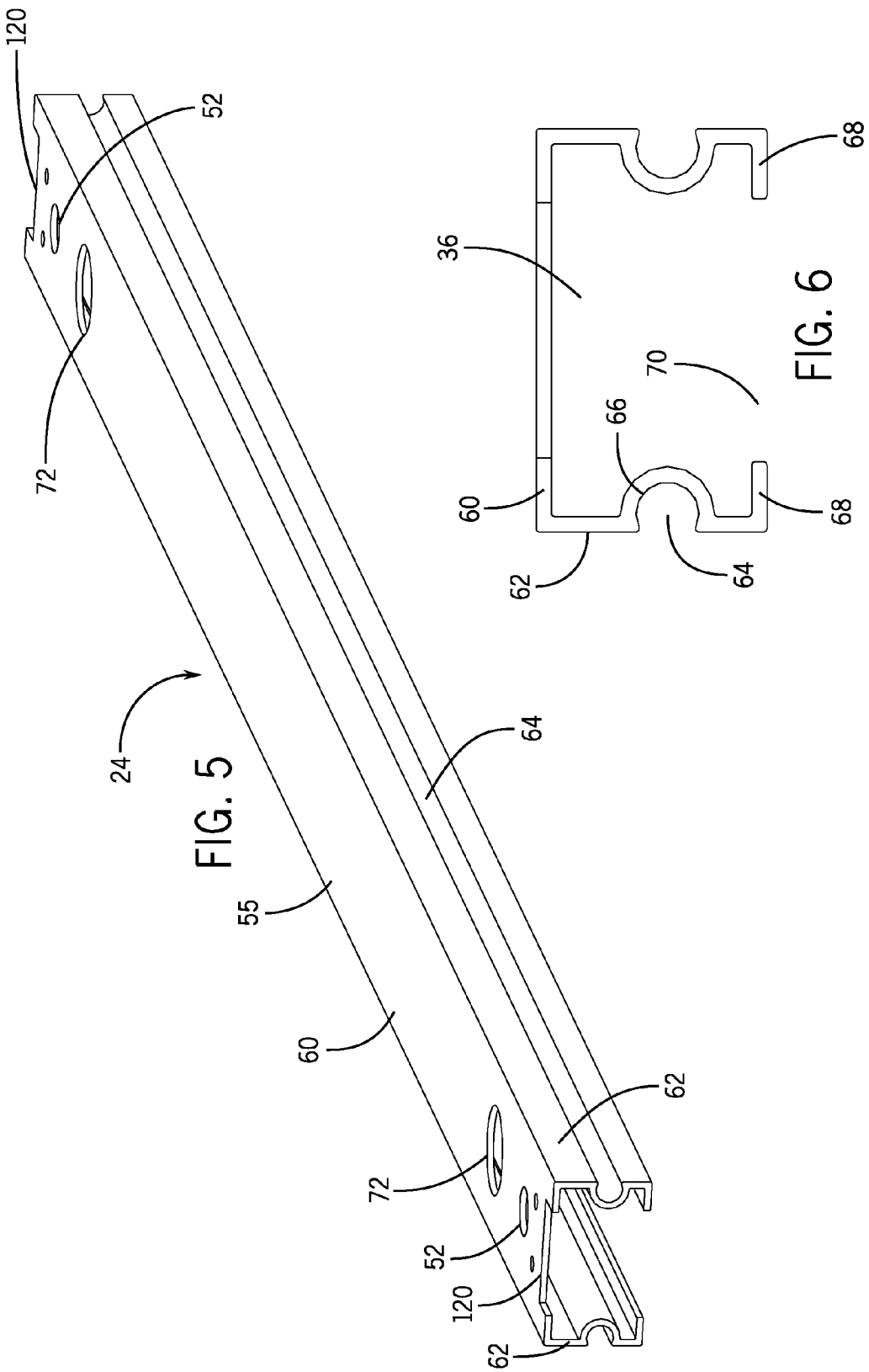

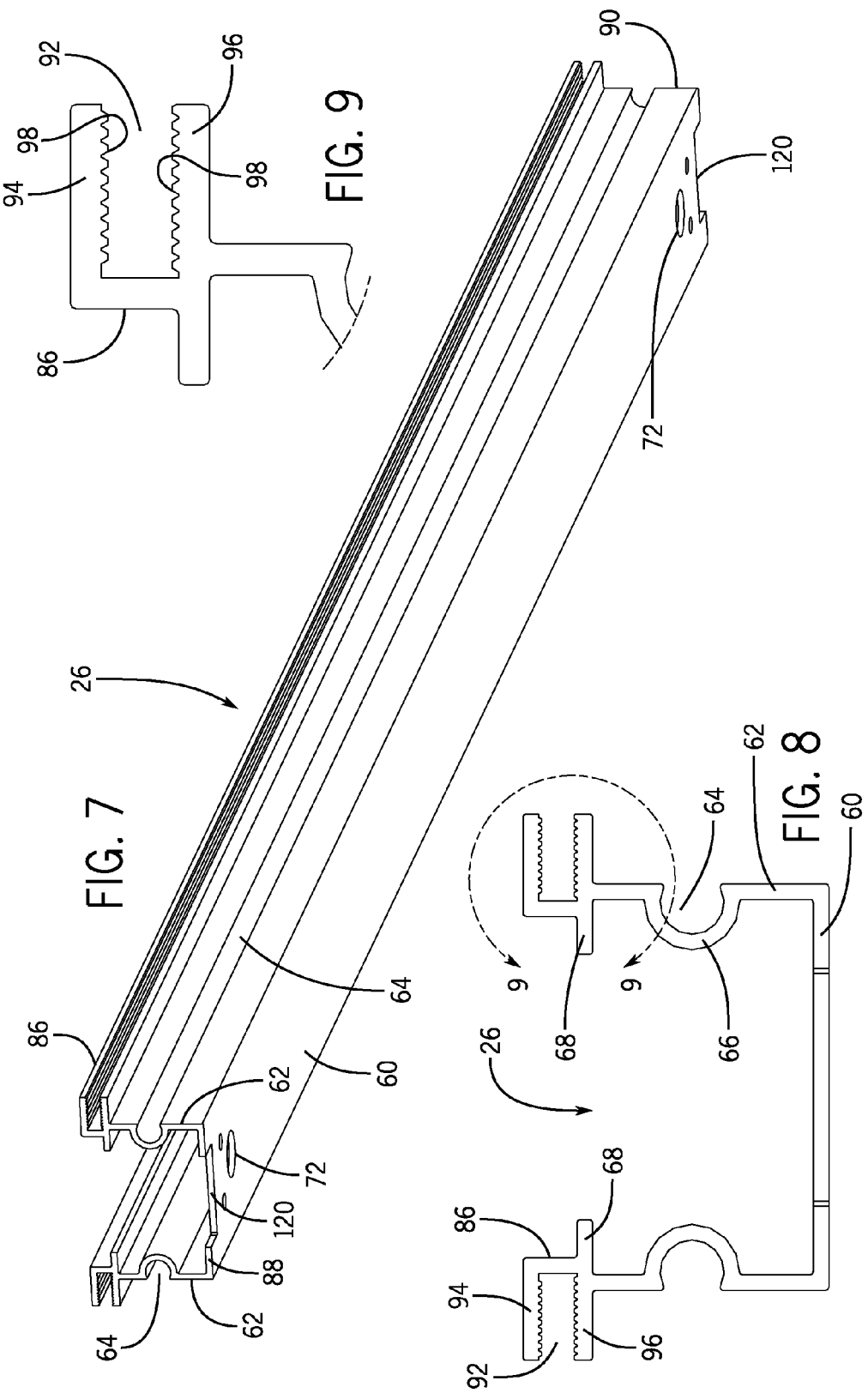

WALL PANEL SYSTEM

BACKGROUND

The present disclosure generally relates to a wall panel system. More specifically, the present disclosure relates to a demountable wall panel system (DWS) that includes a series of wall panels each including upper and lower panel sections separated by an attachment slot.

Panel-type wall systems are commonly used to divide space in an open-plan office environment. In a typical modular panel-type wall system, a number of wall panels are interconnected together in a configuration suitable for the intended use of the space. Each wall panel typically includes a structural frame to which a pair of tiles are mounted. The tiles may be broadly classified as either decorative tiles or functional tiles. Decorative tiles have an acoustic insulating material covered by an appropriate finishing material such as fabric, metal or wood and are designed to provide sound proofing and aesthetic appearance. Functional tiles generally have a tile frame that supports functional components, such as a tool rail, one or more hooks, an opening, a window, a shelf, a marker board, paper management components, etc.

The large number of panel-type wall systems currently available allows a business owner to divide an open space into a series of enclosed areas. The panel-type wall systems oftentimes include continuous solid surfaces that extend from the floor to ceiling when the wall system is configured as desired. Although the solid surface provides for a pleasing appearance, many panel-type wall systems lack the ability to attach components to the wall panels. Therefore, a need exists for a panel-type wall system that includes the ability to configure the wall panel system to the open space and provide method and means of attaching various components to the wall panel.

SUMMARY

The present disclosure generally relates to a wall panel system that includes a series of individual wall panels that can be selectively oriented in a desired configuration. Each of the wall panels includes a height adjustment mechanism and a pair of extruded cross support rails that can be configured to create an attachment slot within the wall panel and to support a sliding door track.

Each wall panel of the wall panel system includes a support frame that is formed from a pair of spaced vertical uprights, a top cross support rail and a bottom cross support rail. The bottom cross support rail of the wall panel includes an open interior defined by a pair of sidewalls and a connecting wall extending between the sidewalls.

Each wall panel includes at least one height adjustment mechanism that is mounted to the support frame and is operable to adjust the height of the wall panel. The height adjustment member includes a support block positioned within the open interior of the bottom cross support rail. The support block receives an adjustment rod that extends through the support block and the connecting wall of the bottom cross support rail. The opposite end of the adjustment rod is received within a mounting bracket positioned near the floor. The adjustment rod is freely rotatable within the mounting bracket such that rotation of the adjustment rod changes the vertical height of the wall panel.

The support block of the height adjustment mechanism includes a main body and a pair of support flanges that extend from the main body. The pair of support flanges support the weight of the wall panel and the decorative tiles that are mounted to each side of the support frame.

In one embodiment of the disclosure, each of the wall panels is formed from an upper panel section and a lower panel section that are connected to each other. Both the upper panel section and the lower panel section include a support frame that includes a pair of spaced vertical uprights, a top cross support rail and a bottom cross support rail. One of either the top cross support rail of the lower panel section or the bottom cross support of the upper panel section includes an attachment rail that defines an attachment slot. The attachment slot extends along the width of the wall panel when the upper panel section is mounted to the lower panel section. The access slot provides for a point of attachment for various different types of external devices or components to the wall panel. In one embodiment of the disclosure, the access slot includes serrated inner surfaces that allow the access slot to receive a threaded connector.

The wall panel includes a top cross support rail that includes the attachment rail and attachment slot. The attachment slot allows the wall panel to selectively receive and support a door track. The door track can receive a sliding door such that a sliding door can be installed on the wall panel system using the top cross support rail formed as part of the wall panels adjacent to a doorway.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings;

FIG. 4 is a section view taken along line 4-4 of FIG. 3;

FIG. 5 is an isometric view of a bottom cross support rail that forms part of the wall panel system;

FIG. 6 is an end view of the bottom cross support rail shown in FIG. 5;

FIG. 7 is a bottom isometric view of a top cross support rail;

FIG. 8 is an end view of the top cross support rail of FIG. 7;

FIG. 9 is a magnified view taken along 9-9 of FIG. 8;

DETAILED DESCRIPTION

Figure 1:
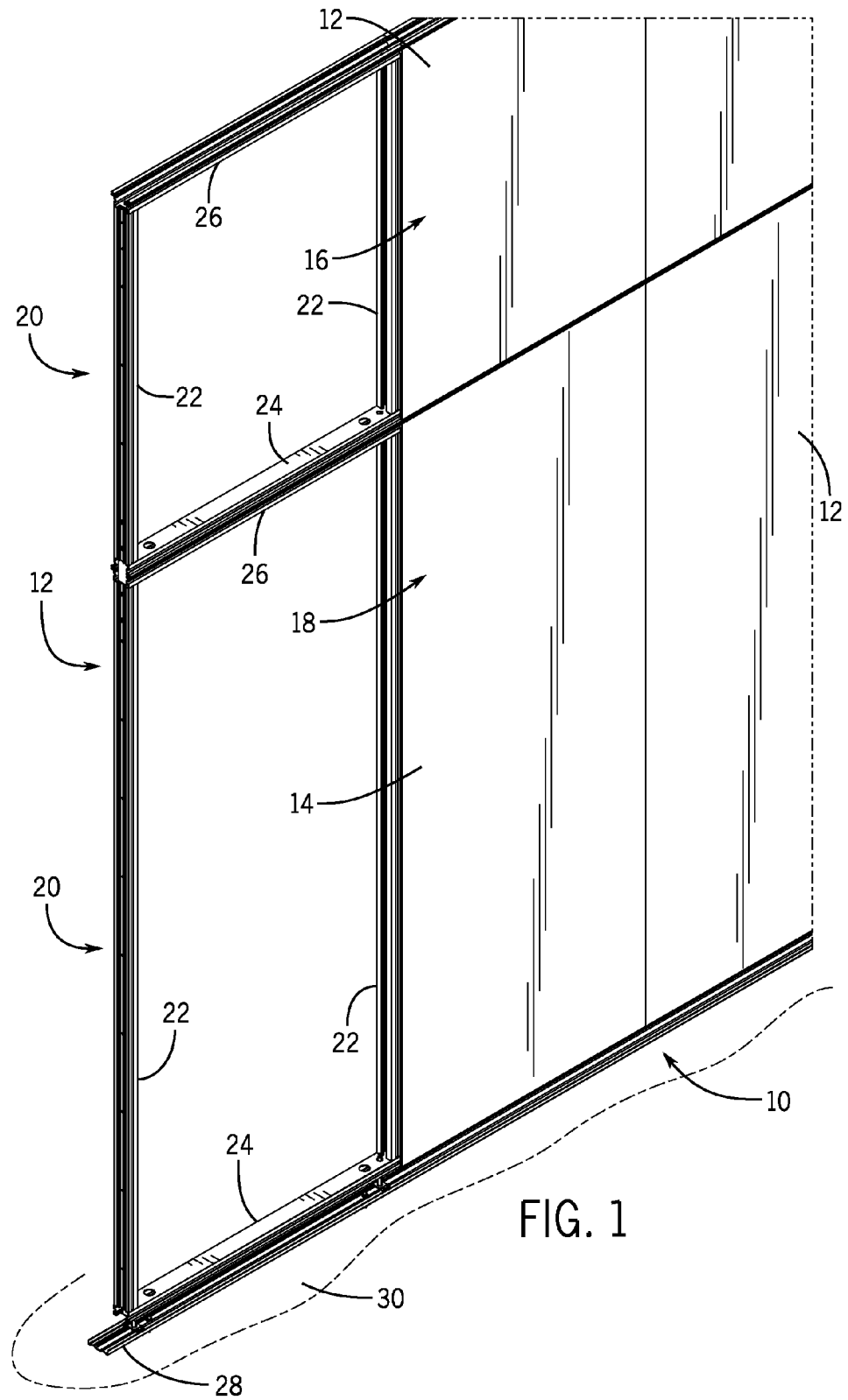
FIG. 1 is a partial isometric view of a wall panel system of the present disclosure.

FIG. 1 illustrates a wall panel system 10 constructed in accordance with the present disclosure. The wall panel system 10 shown in FIG. 1 includes a series of wall panels 12 positioned adjacent to each other to create multiple rooms and dividers within a building. Two of the wall panels 12 shown in FIG. 1 include a decorative outer tile 14 while the end wall panel 12 is shown with the decorative outer tile 14 removed.

In the embodiment shown in FIG. 1, each of the wall panels 12 includes an upper panel section 16 and a lower panel section 18 that combine to form each of the individual wall panels 12. The upper and lower panel sections 16, 18 have generally a similar configuration and each include a support frame 20. Although the upper and lower panel sections 16, 18 are shown having different heights, the panel sections could be of the same height. Alternatively, each of the wall panels 12 could be formed as a single section including a single support frame.

The support frame 20 of the lower panel section 18 includes a pair of spaced vertical uprights 22 that are connected to each other by a bottom cross support rail 24 and a top cross support rail 26. The upper panel section 16 includes a similar support frame 20 that includes similar vertical uprights 22, as well as the bottom cross support rail 24 and the top cross support rail 26. Both the upper panel section 16 and the lower panel section 18 receive an outer decorative tile 14 on both the front and the back of the support frame 18 to provide the decorative, pleasing appearance for the wall panel 12. It is contemplated that the outer decorative tiles 14 could include fabric or another type of material to provide a visually pleasing appearance for the wall panel 12.

Figure 2:
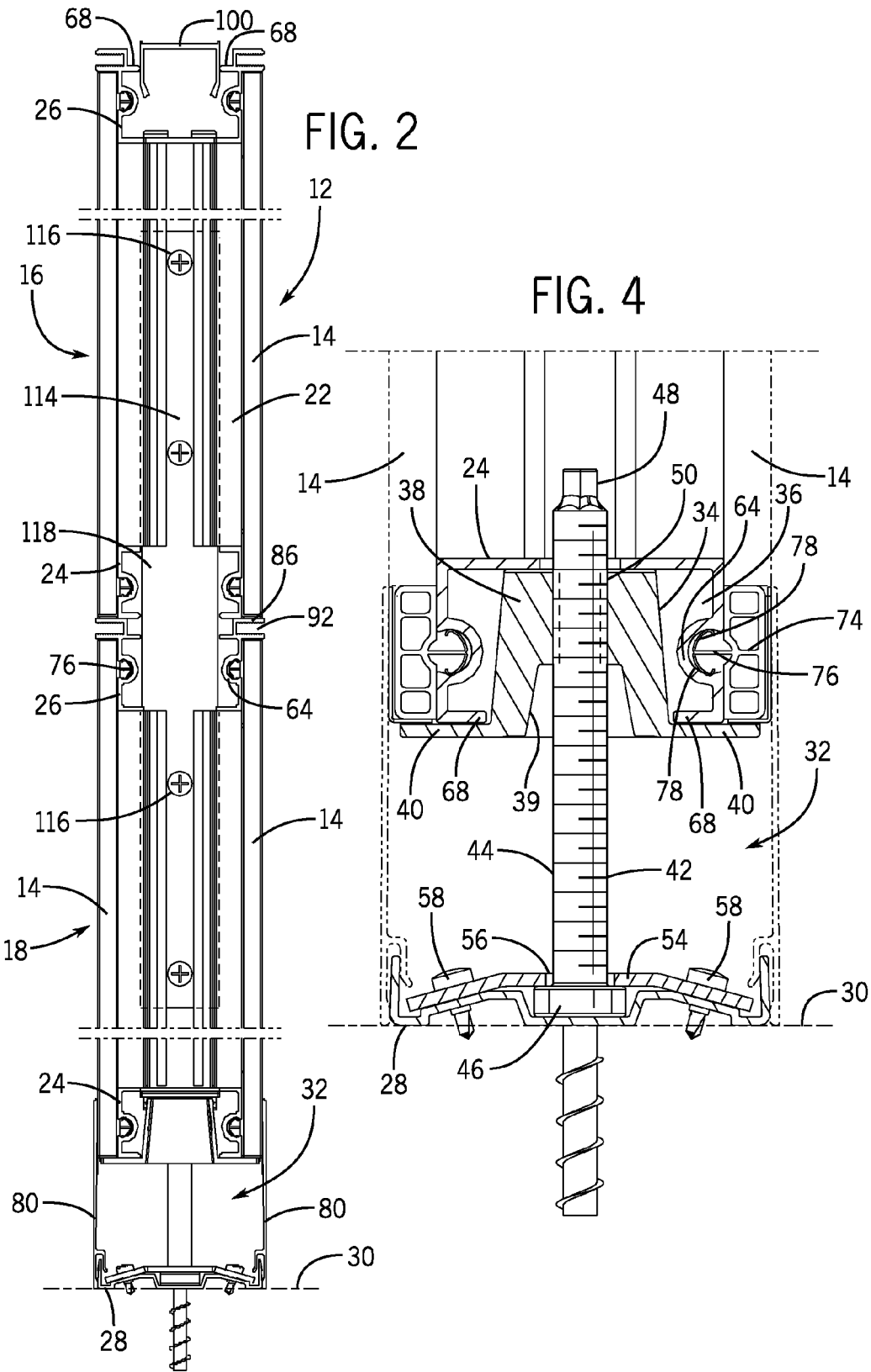
FIG. 2 is a section view of one section of the wall panel system.
Figure 3:
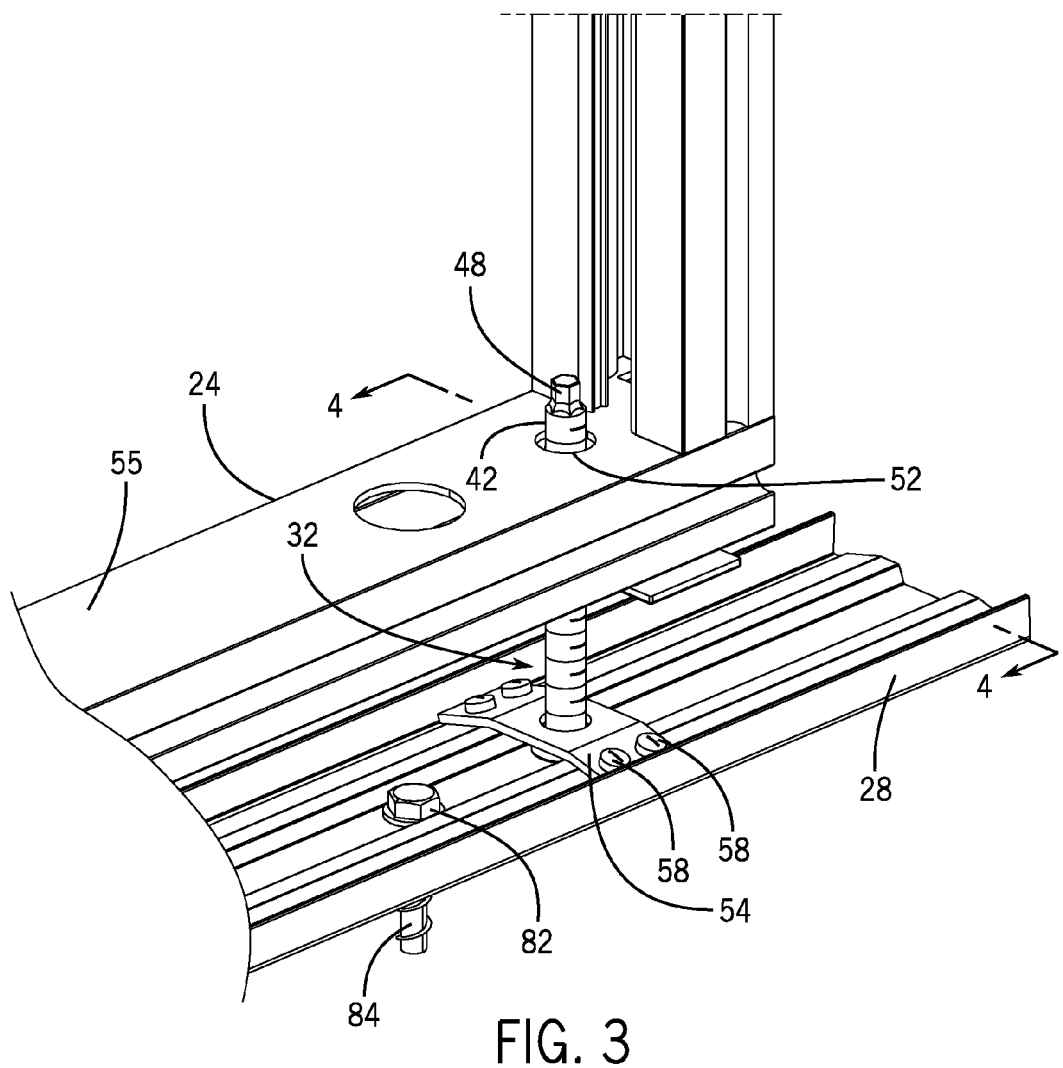
FIG. 3 is a magnified view of the height adjustment mechanism of the present disclosure.

Each of the wall panels 12 is received along a floor track 28 mounted to the floor 30 of a building. The floor track 28 is securely attached to the floor 30 and defines the configuration of the wall panel system 10 in a conventional manner. Referring now to FIGS. 2-4, each wall panel 12 includes a height adjustment mechanism 32 that allows the height of the wall panel to be adjusted from the floor 30. The adjustment mechanism 32 includes a support block 34 mounted within an open interior 36 of the bottom cross support rail 24. The support block 34 includes a main body 38 including a guide base 39 and a pair of extending support flanges 40. The configuration of the main body 38 and the support flanges 40 allows the support block 34 to slide along the length of the bottom support rail 24 and into a desired location.

The height adjustment mechanism 32 further includes an adjustment rod 42 that includes an externally threaded outer surface 44. The adjustment rod 42 includes an expanded head 46 located at a first end and an engagement portion 48 located at an opposite, second end. The externally threaded outer surface 44 of the adjustment rod 42 is received within an internally threaded bore 50 that extends through the main body 38. As illustrated in FIG. 3, the adjustment rod 42 extends through an access opening 52 formed in a top surface 55 of the bottom cross support rail 24. In this position, the engagement portion 48 can be accessed and an adjustment tool (not shown) can be used to rotate the adjustment rod 42. As illustrated in FIG. 4, the expanded head 46 is positioned beneath a bracket 54 which is supported on the floor track 28. The bracket 54 includes a center opening 56 sized slightly larger than the outer diameter of the adjustment rod 42 such that the adjustment rod 42 is freely rotatable within the center opening 56.

The bracket 54 is secured to the floor track 28 by a series of connectors 58. Each of the connectors 58 not only hold the bracket 54 in place along the floor track 28, but also grips carpeting on the floor 30 to prevent movement of the bracket 54 along the length of the floor track 28.

Referring now to FIG. 5, the configuration of the bottom cross support rail 24 will be described. The bottom cross support rail 24 includes a generally planar connecting wall 60 that is perpendicular to and extends between a pair of spaced sidewalls 62. Each of the sidewalls 62 includes a recessed receiving slot 64. The receiving slot 64 in the embodiment illustrated has a generally semicircular inner surface 66 and protrudes into the open interior 36. Each of the sidewalls 62 includes a perpendicular support leg 68 that combine to define an access opening 70 for the open interior 36. As described previously and shown in FIG. 5, the top surface 55 includes an access opening 52 for the height adjustment mechanism at each end as well as a second, larger opening 72 that allows wires and cables to pass through the connecting wall 60. Although the opening 72 is shown circular, the opening 72 could be rectangular and be formed as an elongated slot to provide additional clearance for wires and cables.

Referring back to FIG. 4, the pair of extending support flanges 40 receive the support legs 68 of the bottom cross support rail 24 to support the weight of the entire wall panel. When a user rotates the adjustment rod 42 through the engagement portion 48, the threaded interaction between the threaded outer surface 44 and the internally threaded bore 50 causes the entire wall panel to move either upward or downward depending upon the direction of rotation. As illustrated in FIG. 1, each of the wall panels 12 includes a pair of height adjustment mechanisms 32 to support the weight of the wall panel 12 and adjust the height of the wall panel 12 from the floor 30. Since each of the height adjustment mechanisms 32 can be adjusted separately, the orientation of the wall panel 12 can be adjusted to compensate for an uneven floor.

Referring back to FIG. 4, each of the outer decorative tiles 14 include an attachment strip 74 located at each end of the outer decorative tile 14. The attachment strip 74 includes an attachment feature 76 that includes a pair of flexible fingers 78. As illustrated in FIG. 4, the pair of flexible fingers 78 deflects to hold the attachment strip 74 and the associated outer decorative tile 14 in place within the receiving slot 64 on the bottom cross support rail 24. As can be seen in FIG. 2, the top cross support rail 26 includes a similar receiving slot 64 that receives the attachment feature 76 to hold the top end of the outer decorative tile 14 in place.

As can also be seen in FIG. 2, a pair of cover members 80 are mounted to each side of the floor track 28 to provide a continuous, decorative appearance for the bottom end of the wall panel as the wall panel is vertically adjusted utilizing the height adjustment mechanism 32. Each of the cover members 80 slides along the outer decorative tile 14 during the vertical movement of the wall panel 12.

As illustrated in FIG. 3, the floor track 28 is securely held in place by a series of spaced connectors 82 that include a threaded shaft 84 that extend into the floor to hold the floor track 28 in place.

Referring now to FIGS. 7-9, the top cross support rail 26 is illustrated. Like the bottom cross support rail 24 shown in FIG. 5, the top cross support rail 26 includes a connecting wall 60 that extends between a pair of sidewalls 62 that each include the receiving slot 64. Each of the sidewalls 62 include an extending support leg 68. However, unlike the bottom cross support rail 24, each of the sidewalls 62 of the top cross support rail 26 includes an attachment rail 86 that extends along the entire length of the top cross support rail 26 from a first end 88 to a second end 90. As illustrated in FIGS. 7-9, the entire top cross support rail 26, including the attachment rail 86, is formed as a single, extruded member having the profile shown in FIG. 8. In one embodiment of the disclosure, both the bottom cross support rail 24 and the top cross support rail 26 are formed from an aluminum extrusion. However, other metallic materials are contemplated as being within the scope of the present disclosure.

Referring back to FIGS. 8 and 9, the attachment rail 86 includes an open attachment slot 92 that is defined between a first wall 94 and a second wall 96. The first and second walls 94, 96 are generally parallel to each other and define the width of the attachment slot 92. The inner surface of each of the walls 94, 96 includes a serrated surface 98 designed to receive a threaded connector.

Referring back to FIG. 2, the wall panel 12 includes the upper panel section 16 and the lower panel section 18 stacked on top of each other. Specifically, the bottom cross support rail 24 of the upper panel section 16 rests on and is supported by the top cross support rail 26 of the lower panel section 18. As shown in FIG. 2, a panel splice strip 114 is connected between the upper panel section 16 and the lower panel section 18 to secure the two sections together. An identical splice strip 114 is included on the opposite side of the wall panel 12. The splice strip is connected to the vertical uprights 22 by a series of connectors 116. The splice strip 114 includes a center plate 118 that is aligned with the bottom cross support rail 24 and the top cross support rail 26. As shown in FIGS. 5 and 7, each of the support rails 24, 26 includes an end notch 120 that receives the center plate 118. The panel splice strip 114 thus securely connects the upper panel section 16 to the lower panel section 18 and limits the lateral movement between the support rails 24, 26.

In the assembled configuration of FIG. 2, the attachment slot 92 of the attachment rail 86 is accessible between the outer decorative tiles 14 of the upper and lower panel sections 16, 18. The attachment slot 92 provides a convenient point of attachment for different types of hanging devices, such as a bulletin board, message board, desk, bookshelf, or any other type of device that may be mounted to an inner surface of the wall panel 12.

As can be further seen in FIG. 2, top cross support rail 26 that forms part of the upper panel section 16 receives a ceiling track 100 in the opening between the support legs 68. The receipt of the ceiling track 100 as illustrated further supports the wall panel 12 to restrict the wall panel 12 from tipping in its assembled condition.

Figure 10:
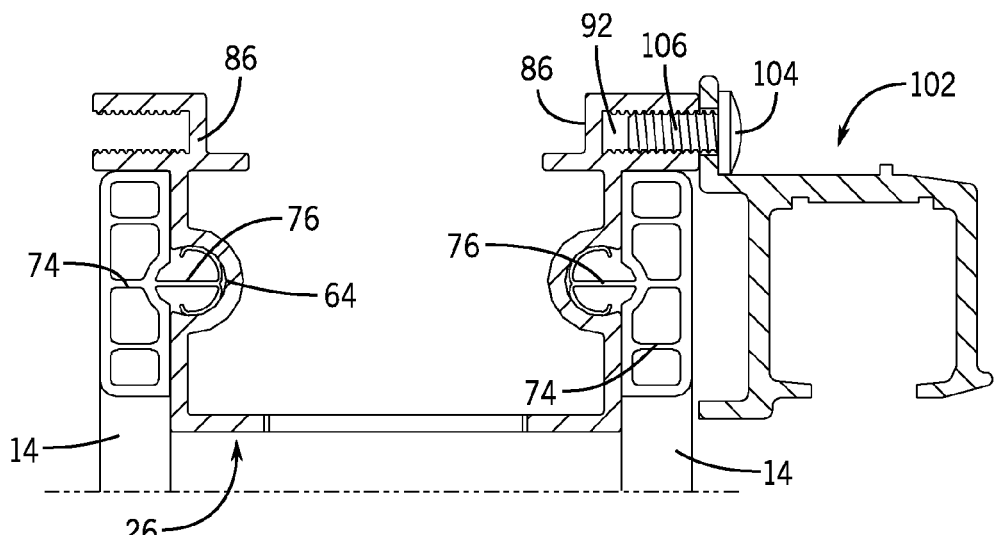
FIG. 10 is a section view showing the attachment of a sliding door track to the top cross support rail.
Figure 11:
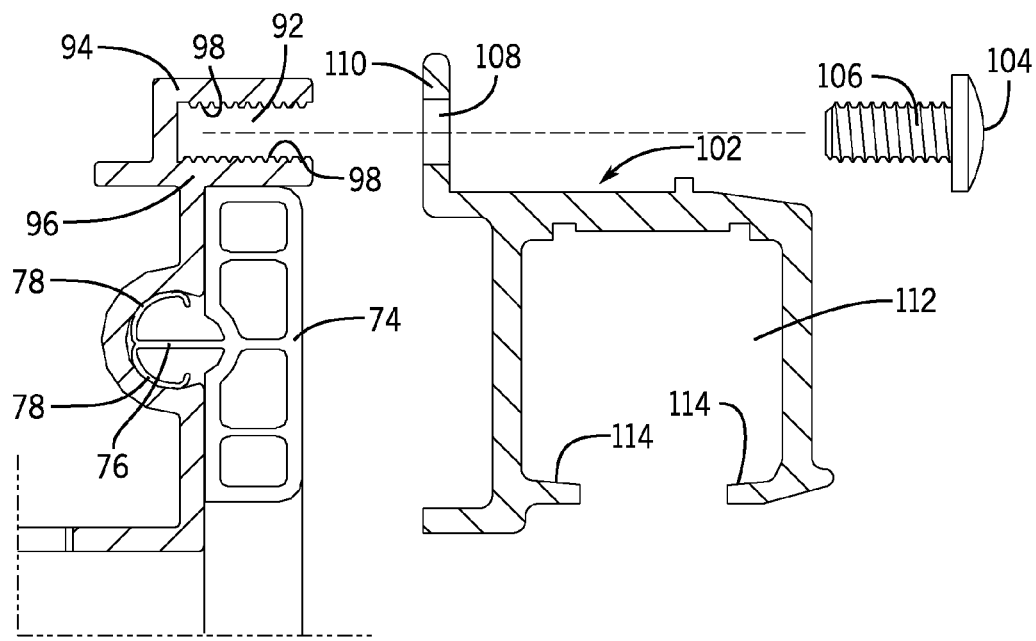
FIG. 11 is an exploded view showing the attachment of the sliding door track to the top cross support rail.

FIGS. 10 and 11 illustrate an additional feature of the wall panel and specifically the top cross support rail 26 including the attachment rail 86. As described previously, both of the outer decorative tiles 14 include an attachment strip 74 having the attachment structure 76 that holds the outer decorative tile within the receiving slot 64. In the embodiment illustrated, a sliding door track 102 is attached to the top cross support rails 26 by a series of connectors 104 that are each received within the attachment slot 92 defined by the attachment rail 86. As illustrated in FIGS. 10 and 11, a threaded shaft 106 of the connector 104 is received within the attachment slot 92 and interacts with the serrated surface 98 formed on each of the walls 94, 96. The connector 104 passes through an opening 108 formed in the attachment flange 110 to support the door track 102 as illustrated. The door track 102 includes a roller slot 112 that receives and retains rollers of a sliding door (not shown). The rollers of the sliding door roll upon the contact surfaces 114 to allow the sliding door to move along the length of the door track 102. In the preferred embodiment of the disclosure, the door track 102 is formed from an extruded aluminum material that provides the required strength and durability without excessive weight.

As can be understood in the drawing figures, the extruded bottom cross support rail 24 and the top cross support rail 26 have a generally similar configuration and are used to receive the height adjustment mechanism 32, the door track 102, and to form the attachment slot 92 between the upper panel section 16 and the lower panel section 18.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A wall panel of a wall panel system for use in a building having a floor, the wall panel comprising:
   a support frame including a pair of spaced vertical uprights, a top cross support rail and a bottom cross support rail, the bottom cross support rail including an open interior defined by a pair of sidewalls and a connecting wall extending between the sidewalls;
   at least one height adjustment mechanism mounted to the support frame and operable to adjust the height of the wall panel, the height adjustment mechanism comprising:
      a support block positioned within the open interior of the bottom cross support rail, the support block including a main body and a pair of support flanges extending from the main body, wherein the pair of support flanges extend outwardly past the pair of sidewalls of the bottom cross support rail such the pair of support flanges engage and support the weight of the wall panel;
      an adjustment rod extending through the support block and the connecting wall of the bottom cross support rail, wherein the adjustment rod includes an engagement portion positioned above the connecting wall of the bottom cross support rail; and
      a mounting bracket configured to rotatably receive the adjustment rod, wherein rotation of the adjustment rod relative to the support block adjusts the height of the wall panel.

2. The wall panel of claim 1 wherein the support block includes an internally threaded bore that engages an externally threaded shaft of the adjustment rod.

3. The wall panel of claim 1 wherein the support block is slidably received within the open interior of the bottom cross support rail to permit selective positioning of the support block within the open interior.

4. The wall panel of claim 1 wherein the mounting bracket is attached to a floor guide of the wall panel system.

5. A wall panel for use in a building having a floor, comprising:
   an upper panel section including at least one outer decorative tile mounted to a support frame, the support frame including a pair of spaced vertical uprights, a top cross support rail and a bottom cross support rail; and
   a lower panel section having at least one outer decorative tile mounted to a support frame including a pair of spaced vertical uprights, a top cross support rail and a bottom cross support rail, wherein the top cross support rail of the lower panel section supports the bottom cross support rail of the upper panel section,
   wherein one of the top cross support rail of the lower panel section or the bottom cross support rail of the upper panel section includes attachment rails attached to sidewalls of either the top cross support rail of the lower panel section or the bottom cross support rail of the upper panel section, the attachment rails each including an open attachment slot extending along the entire length of the sidewalls and being perpendicular to the sidewalls and located between the upper and lower panel sections when the lower panel section supports the upper panel section, the attachment slot including an upper serrated contact surface and a lower serrated contact surface.

6. The wall panel of claim 5 wherein both the top cross support rail and the bottom cross support rail of the upper and lower panel sections include a recessed receiving slot sized to receive an attachment feature formed on the at least one outer decorative tile of the upper panel section and the lower panel section.

7. The wall panel of claim 6 wherein the attachment feature includes a pair of flexible fingers that engage the receiving slot.

8. The wall panel of claim 5 wherein the upper and lower serrated surfaces are configured to receive a threaded connector.

9. A wall panel for use in a building having a floor, comprising:
an upper panel section including at least one outer decorative tile mounted to a support frame, the support frame including a pair of spaced vertical uprights, a top cross support rail and a bottom cross support rail;
a lower panel section having at least one outer decorative tile mounted to a support frame including a pair of spaced vertical uprights, a top cross support rail and a bottom cross support rail, wherein the top cross support rail of the lower panel section supports the bottom cross support rail of the upper panel section,
wherein one of the top cross support rail of the lower panel section or the bottom cross support rail of the upper panel section includes attachment rails attached to sidewalls of either the top cross support rail of the lower panel section or the bottom cross support rail of the upper panel section, the attachment rails each including an open attachment slot extending along the entire length of the sidewalls and being perpendicular to the sidewalls and located between the upper and lower panel sections when the lower panel section supports the upper panel section; and
at least one height adjustment mechanism operable to adjust the height of the wall panel, the height adjustment mechanism comprising:
a support block positioned within an open interior of the bottom cross support rail of the lower panel section;
an adjustment rod extending through the support block and a connecting wall of the bottom cross support rail of the lower panel section; and
a mounting bracket configured to rotatably receive the adjustment rod, wherein rotation of the adjustment rod relative to the support block adjusts the height of the wall panel.

10. The wall panel of claim 9 wherein the support block is received within an open interior of the bottom cross support rail of the lower panel section and a pair of support flanges formed on the support block engage the pair of sidewalls to support the support frame of the lower panel section.

11. A wall panel system for use in a building having a floor, comprising:
a series of individual wall panels each having a support frame including a pair of spaced vertical uprights, a bottom cross support rail, and a top cross support rail, wherein the top cross support rail includes an open interior defined by a pair of spaced sidewalls and a connecting wall extending between the sidewalls, wherein at least one of the sidewalls includes an attachment rail extending perpendicular to the sidewall and defining an open attachment slot that extends along the entire length of the sidewall, wherein the attachment slot includes a first serrated surface and a second serrated surface configured to receive a threaded connector; and
a sliding door track secured to the attachment slot of the top cross support rail, wherein the sliding door track includes an attachment flange and defines an open interior sized to receive a sliding door.

* * * * *